April 19, 1966  D. A. KRIES  3,246,472
HYDRAULIC SERVO SYSTEM FOR POWER STEERING
Filed Dec. 21, 1964  3 Sheets-Sheet 1
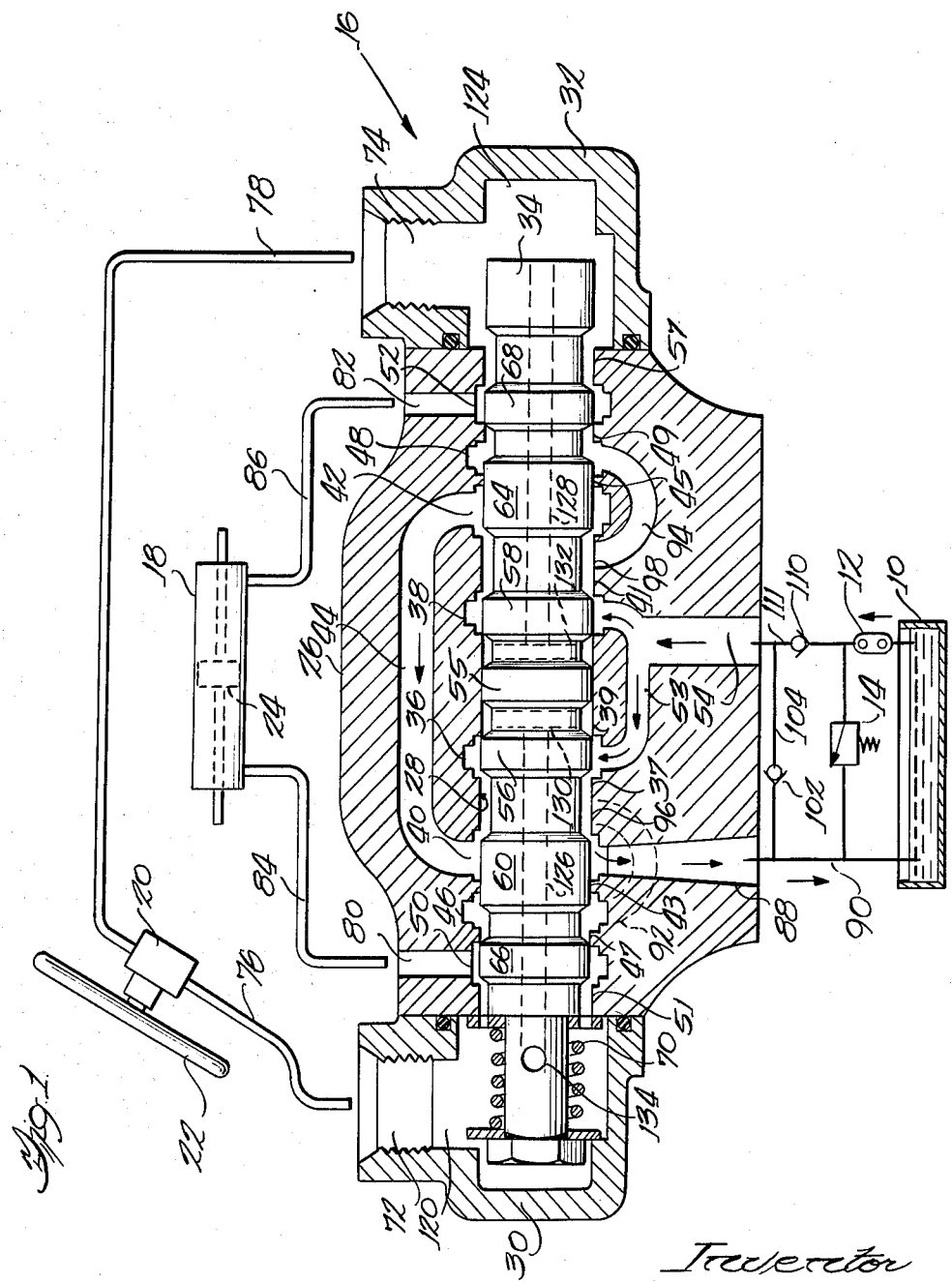

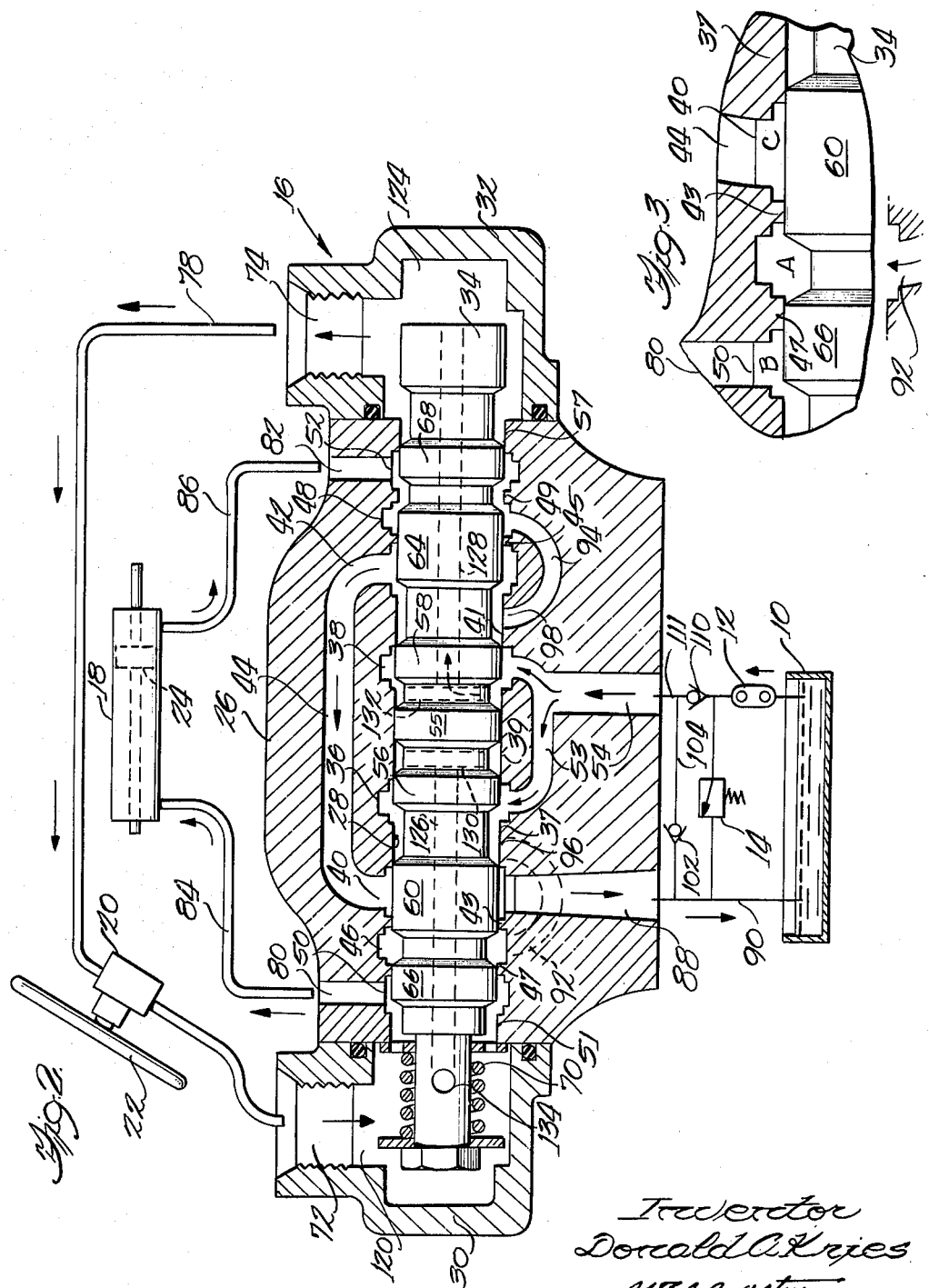

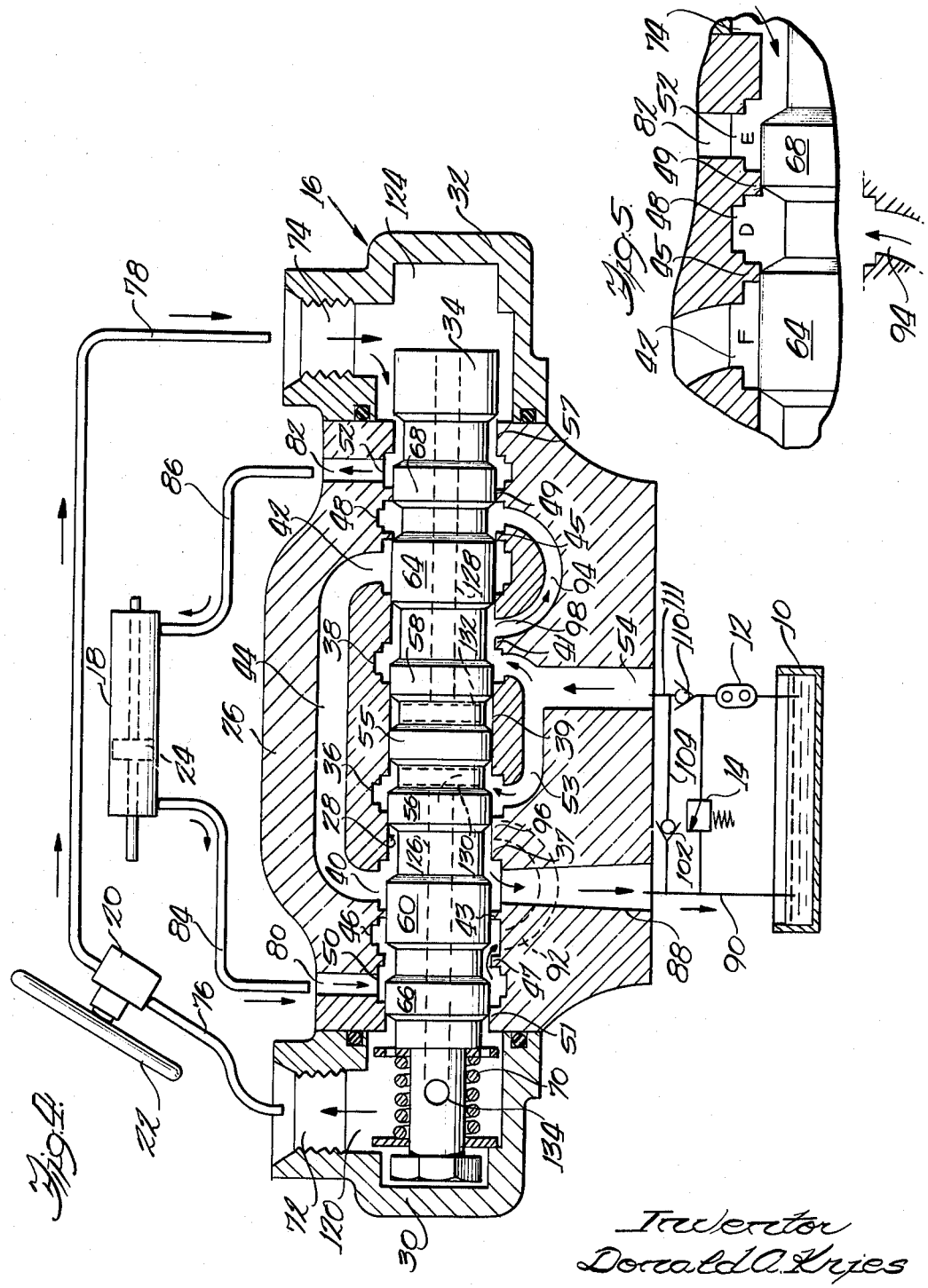

United States Patent Office 3,246,472
Patented Apr. 19, 1966

3,246,472
HYDRAULIC SERVO SYSTEM FOR POWER STEERING
Donald A. Kries, Naperville, Ill., assignor to International Harvester Company, Chicago, Ill., a corporation of New Jersey
Filed Dec. 21, 1964, Ser. No. 420,054
7 Claims. (Cl. 60—52)

This invention relates to hydraulic servo systems that are especially useful as power steering mechanisms for vehicles.

Power steering servo systems such as that referred to generally include a power pump driven by the engine, a manually operated control pump actuated by turning the vehicle steering wheel, a control valve and a double acting hydraulic steering cylinder or motor directly connected to the vehicle wheels to be steered. A closed hydraulic circuit is provided between the control pump and the steering cylinder independent of the engine operated power pump so that the motor can be operated by the manually actuated control pump despite failure of the engine or the engine operated power pump.

The hydraulic control valve conventionally used to control the flow of fluid from the power pump and the control pump to the hydraulic steering cylinder comprises an open center spool valve including a valve body having a plurality of annular grooves and passages with a movable valve spool member carried within the body. The flow of fluid through the valve in various flow circuits between the hydraulic steering cylinder and the power and control pumps is determined by the position of the spool member within the valve body.

With the engine driven pump operating, high pressure fluid from the power pump is directed through the spool valve to the control pump where it assists the vehicle operator in turning the steering wheel. High pressure fluid from the control pump is then directed through the control valve to the steering cylinder where the pressure of fluid against a cylinder piston causes it to move, turning the vehicle wheels.

In any hydraulic system utilizing a spool valve, some leakage of fluid between adjacent valve grooves is considered normal. In a hydraulic power steering system, this leakage of fluid between adjacent valve grooves results in steering wheel slip or drift involving an inability to hold a particular steering position of the road wheel without further steering movement of the steering wheel. While steering wheel slip is noticeable to some extent and somewhat annoying even under ordinary steering conditions with light duty vehicle, it is especially noticeable and objectionable where relatively heavier vehicles are involved. Thus, in steering a large heavy duty tractor along the side of a hill, considerable side pressure is placed upon the wheels of the vehicle and steering wheel slip increases noticeably; and in some cases it has been found necessary to turn the steering wheel one complete revolution merely to maintain the rod wheels in position for forward travel of about 300 to 400 feet along the side of a hill.

Thus, it is a general object of the present invention to provide an improved hydraulic servo system which is particularly adaptable for use as a power steering mechanism.

It is another object of the invention to provide a hydraulic servo system incorporating an improved hydraulic control valve to reduce objectionable fluid leakage across the valve.

Still another object of the invention is to provide an improved hydraulic power steering servo system to minimize steering wheel slip due to valve leakage.

Yet another object of the invention is to provide an improved control valve suitable for use with conventional hydraulic power steering systems wherein control valve leakage of fluid contributing to steering wheel slip is minimized.

Further objects of the invention pertain to the particular valve structure and arrangements whereby the above objects are attained.

The invention both as to its structure and mode of operation, will be better understood by reference to the following disclosure and drawings, forming a part thereof, wherein:

FIG. 1 is a somewhat diagrammatic view of a hydraulic servo system utilized as a hydrostatic power steering mechanism showing an enlarged sectional view of a preferred form of a hydraulic control valve;

FIG. 2 is a diagrammatic view similar to the showing of FIG. 1 with the valve spool of the control valve actuated to the right;

FIG. 3 is an enlarged view in section of a portion of the valve shown in FIG. 2;

FIG. 4 is a diagrammatic view similar to the showing of FIG. 1 with the valve spool of the control valve actuated to the left;

FIG. 5 is an enlarged view in section of a portion of the valve shown in FIG. 4.

Referring to the drawings there is shown in FIG. 1 a hydraulic servo system incorporating an improved hydraulic flow control valve in accordance with the invention. The system includes a reservoir 10, an engine driven pressure or power pump 12, a pressure relief valve 14, a hydraulic control valve designated generally by the numeral 16, a reversible hydraulic motor 18 and a manually operated control pump 20. While the servo system shown may be used for any desired purpose, that shown in the drawings is intended primarily for use in a hydrostatic power steering system. Accordingly, the control pump 20 is of conventional design and is manually operated by a steering wheel 22 of a vehicle to be steered. The hydraulic motor 18 comprises a conventional double acting steering cylinder slidably receiving a piston 24 operatively connected to the wheels or other elements to be steered.

The control valve 16 includes a housing 26 provided with a bore 28, left and right end caps 30, 32 closing the ends of the bore; and a valve spool 34 slidably received within the bore. The bore is provided with a plurality of axially spaced annular grooves: left and right central pressure port grooves 36, 38; left and right reservoir return grooves 40, 42 connected by passageway 44; left and right intermediate grooves 46, 48; and left and right outer motor grooves 50, 52. The left and right central pressure port grooves 36, 38 are connected by a valve passageway 53 in communication with a pressure port 54 connected to the power pump. The bore is also provided with a plurality of lands: central lands 37, 39, 41; left and right intermediate lands 43, 45; left and right outer lands 47, 49; and cap lands 51 and 57 adjacent the end caps.

The valve spool 34 has a plurality of axially spaced annular lands and grooves including a center land 55, first left and right central lands 56, 58, left and right intermediate lands 60, 64 and left and right end lands 66, 68. A centering or spool biasing spring 70 is provided conventionally about one end of the spool to maintain it in a centered or neutral position shown in FIG. 1. The left and right end caps 30, 32 are provided with left and right control ports 72, 74 in communication with the manually operated control pump 20 by means of lines 76, 78 respectively. The valve housing 26 is also provided with left and right motor ports 80, 82 in communication with the motor grooves 50, 52 respectively and connected to the hydraulic motor 18 by means of lines 84, 86.

A reservoir return port 88, in communication with the reservoir return grooves 40, 42, is connected to the reservoir by means of line 90. A housing passageway 92 connects left intermediate groove 46 with a land opening 96 provided in housing land 37. Similarly, a passageway 94 connects the right intermeidate groove 48 with a right land opening 98 in housing land 41.

A ball check valve 102 is provided conventionally in a line 104 between the pressure port and the return port. When the engine driven pump is operating, the ball check valve is seated under pressure; but when the engine driven pump is not opertaing, the ball check valve opens to divert low pressure fluid displaced from the steering cylinder into the pressure port and back to the control pump 20, to complete a closed manual steering circuit. A circulating pressure check valve 110 is provided conventionally in the pressure port to prevent low pressure fluid, returning through line 104 and port 54 to the control pump, from flowing into a pressure pump line 111 leading to the pressure pump 12.

The left and right end caps 30, 32 in conjunction with the valve spool and housing define left an right fluid chambers 120, 124. Upon manually turning the steering wheel to operate the control pump 20, fluid under pressure is directed into one of the chambers with a corresponding flow of fluid from the opposite chamber to the control pump, causing a shifting of the valve spool in the housing bore by reason of the pressure differential between the two chambers. The valve spool is provided with axial passageways 126, 128 leading to radial passageways 130, 132 respectively opening into the valve bore. Passageway 126 is in communication with the left chamber 120 by means of orifice 134; and passageway 128 opens into the right chamber 126.

With the engine driven pump operating and the valve spool in the neutral position shown in FIGURE 1, hydraulic fluid delivered from the engine driven pump enters the pressure port and passes by means of passageways 53 and 44 to the return port and reservoir. The end spool lands 66, 68 are in position against two intermediate housing lands 47 and 49 positioned respectively between housing grooves 50 and 46; and grooves 52 and 48, preventing passage of fluid from the pressure port 54 into the motor ports 80, 82 or the control ports 72, 74. With the valve spool centered, fluid within the chambers 120, 124, the steering cylinder lines 84, 86, and the control pump lines 76, 78 remains in a static condition.

Referring now to FIG. 2, when it is desired to steer the vehicle to the right, the steering wheel is turned clockwise directing a flow of fluid from the control pump 20 into the left chamber 120 to the hydraulic motor with a corresponding movement of fluid displaced from the hydraulic motor flowing from chamber 124 through line 78 to the other side of the control pump. When the pressure of fluids flowing from the control pump exceeds a predetermined amount sufficient to overcome the resistance of the spool biasing spring 70, the valve spool shifts to the right into the position shown in FIG. 2.

In actual practice, a pressure of between about 15 to 40 p.s.i. is sufficient to overcome the spring resistance. Shifting of the spool to the right causes spool land 60 to substantially occlude groove 40 closing off communication of the reservoir return port from the adjacent areas of higher pressure power pump fluid between the spool and grooves 46 and 36; the shifting also closes off groove 42, 48 and 52 from communication with the pressure port and the control port. In actual practice, the power pump may develop fluid pressures of up to about 1800 p.s.i.; a flow of high pressure fluid from the power pump 12 is directed through pressure port 54 and passageways 53 and 92 into grooves 36 and 46 as indicated by the arrows in FIG. 2.

Fluid also passes to the right through radial and axial passageways 132, 128 and chamber 124 to the control pump 20 where it is available to help an operator in turning the steering wheel. The actual fluid pressure utilized by the operator is dependent upon the resistance to turning offered by the wheels to be steered. While considerable pressure is available from the pressure pump, the operator must always supply a small amount of steering effort to develop sufficient fluid pressure to overcome the centering spring resistance. Hence, the flow of fluid from the control pump is always at a slightly higher pressure than the pressure of fluid directed to the control pump 20 from the power pump 12.

With the valve spool 34 actuated to the right, FIG. 2, high pressure fluid from the control pump 20 enters the left chamber 120 and flows through the left motor port 80 into the left hand side of the steering cylinder. The high pressure fluid flowing into the steering cylinder is directed against the cylinder piston 24 causing it to move to the right turning the vehicle wheels. The volume of fluid moving into and out from the cylinder is equal; and movement of the steering cylinder piston 24 to the right effects a flow of displaced low pressure fluid through line 86 into the right motor port 82 through passageways 94 and 44 into the reservoir return port 88 and to the reservoir.

In accordance with an important feature of the invention, high pressure control pump fluid moving through the left cylinder port 80 to the steering cylinder 18 is prevented from leaking about the valve lands into reservoir return line 90 by a uniquely disposed chamber or cavity of power pump fluid under high pressure. This may be seen more readily by reference to FIG. 3 showing a portion of the control valve with the spool 34 in an actuated right position, the valve being shown on an enlarged scale. With the spool in its actuated right position, spool land 66 is moved into position against housing land 47; and spool land 60 is moved into position against housing lands 37 and 43 on either side of housing groove 40.

Thus, the spool lands 60 and 66 in conjunction with housing groove 46 define a fluid cavity or chamber designated generally by the letter A and filled with relatively high pressure power pump fluid supplied from the power pump 12 through passageway 92. Fluid flowing from the control pump 20 to left motor port 80 passes through a fluid chamber designated generally by the letter B, FIG. 3, between spool land 66 and housing groove 50. As should be clear, fluid in chamber B from the control pump is at a slightly higher pressure than the fluid in chamber A from the power pump. Low pressure fluid displaced from the right end of the steering cylinder 18 and returning to the reservoir flows through line 86 and port 82, passing through passageway 94 into a chamber between spool land 60 and housing groove 40 designated generally in FIG. 3 by the letter C.

Consequently, a volume of relatively high pressure fluid is maintained in chamber A between a fluid volume of high pressure control pump fluid in chamber B and a volume of relatively low pressure reservoir return fluid in chamber C. Since there is a relatively low pressure differential between chambers A and B, generally equivalent to the pressure required to overcome the resistance of the centering spring, leakage of fluid from chamber B across chamber A into the reservoir return chamber C is relatively remote. On the other hand, while there is a relatively great pressure differential between power pump fluid in the intermediate chamber A and the low pressure fluid in reservoir return chamber C with corresponding fluid leakage taking place between the housing and spool lands 60 and 43 separating chambers A and C, this leakage does not affect steering clip since there is little leakage of control pump fluid from chamber B.

Referring now to FIG. 4, the manner in which the system operates with the valve spool actuated to the left is shown, upon turning the steering wheel to the left, fluid flowing from the control pump through line 78 into chamber 124 overcomes the resistance of centering spring 70 and the spool shifts to the left as shown in FIG. 4 permitting a flow of relatively high pressure fluid between about 200 and 1800 p.s.i. from the power pump through passageway 94 into a fluid cavity or chamber between the spool lands 64, 68 and housing groove 48, the chamber being designated generally by the letter D in FIG. 5. Power pump fluid also moves through passageways 53 and radial and axial passageways 130, 126 through control port 72 to the control pump. Relatively higher pressure control pump fluid moving from the control pump 20 on its way to the steering cylinder 18, as indicated by the arrows in FIG. 4, flows into the right chamber 124 and to motor port 82 simultaneously filling a fluid chamber between spool land 68 and the housing groove 52, the chamber being designated generally by the letter E in FIG. 5.

Lower pressure fluid displaced from the left end of the steering cylinder is directed through line 84 to left cylinder port 80 where it is directed through passageway 92 to reservoir return port 88; this lower pressure fluid also flows through passageway 44 opening into housing groove 42; and fills the chamber between groove 42 and spool land 64, designated generally by the letter F in FIG. 5, with low pressure fluid. Referring now to FIG. 5, it is seen that a pool of relatively high pressure power pump fluid is maintained in chamber D between the low pressure fluid in chamber F and the high pressure control pump fluid in chamber E. Leakage of high pressure control pump fluid from chamber E across lands 68 and 49 is thus minimized by reason of a very low pressure differential between chambers D and E. While there may be a relatively high fluid pressure differential between chamber D filled with power pump fluid, and chamber F filled with reservoir return fluid, promoting leakage of power pump fluid from chamber D into chamber F, such leakage does not affect the ability of the steering wheel and control pump to operate the steering cylinder without wasted motion or steering wheel slip.

From the above description of the invention, its operation should be clear. The control valve of the present invention is exceptionally effective in reducing steering wheel slip or drift due to fluid leakage in the hydraulic control valve. Generally, any hydraulic fluid which leaks from the control pump lines into the reservoir return lines before reaching the steering cylinder results in wasted motion or slip of the steering wheel. In conventional hydraulic steering control valves, leakage has been found to occur in the area of the valve lands between the reservoir return port and adjacent areas filled with high pressure fluid from the manually operated control pump. To prevent this objectionable leakage of control pump fluid, an intermediate fluid chamber has been provided between valve areas filled with control pump fluid and adjacent valve areas filled with reservoir return fluid. This intermediate chamber comprises a cavity on either side of the valve between an intermediate valve housing groove and an intermediate valve spool groove. This intermediate fluid chamber is filled with relatively high pressure fluid from the engine driven power pump, thus interposing a buffering zone of relatively high pressure fluid between an area of low pressure reservoir return fluid and an area of high pressure control pump fluid on its way to the steering cylinder; and the intermediate high pressure chamber provides a protective shield discouraging valve leakage of control pump fluid and virtually eliminating steering wheel drift due to valve leakage.

Since modifications of the details of the structure as illustrated in the various figures are contemplated, the invention should be limited only by the scope of the appended claims.

What is claimed is:

1. In a hydraulic servo system for a power steering assembly including a fluid reservoir, an engine driven pump, a manually operated control pump connected to a steering wheel to actuate said control pump, a reversible hydraulic steering cylinder connected to the wheels of a vehicle to be steered, and an open center spool valve to control the flow of fluid to said hydraulic cylinder from said pumps, said valve providing a fluid circuit whereby fluid from said engine driven pump is directed through said control pump before being directed to said steering cylinder, said valve including means providing first and second fluid chambers, said first fluid chamber containing control pump fluid on its way to said steering cylinder, said control pump fluid being at a relatively greater pressure than said engine driven pump fluid, said valve second fluid chamber containing fluid displaced from said steering cylinder, said fluid being at a relatively lower pressure than said engine driven pump fluid, the improvement comprising: means providing a third fluid chamber containing fluid from said engine driven pump, said third fluid chamber being positioned in said valve between said first and second fluid chambers presenting a buffering zone of intermediate pressure fluid restricting leakage of fluid from said first fluid chamber tending to result in steering wheel slip.

2. In a control valve for a hydrostatic power steering system for a vehicle having wheels to be steered, said system including a reversible hydraulic steering cylinder connected to the wheels to be steered, an engine driven pump to move fluid from a reservoir and a reversible manually actuated control pump connected to a steering wheel, said steering wheel being the means for manually actuating said control pump, said control valve controlling the flow of fluid between said pumps and said motor, said valve including means providing a first and a second fluid cavity within said valve, said first fluid cavity being filled with fluid moving from said control pump to said steering cylinder, and said second fluid cavity being filled with low pressure fluid displaced from said steering cylinder and returning through said valve to said reservoir, the improvement comprising means providing a third valve fluid cavity of relatively high pressure fluid from said engine driven pump, said third fluid cavity being interposed between said first and second fluid cavities.

3. In a control valve for a hydraulic servo system having a reversible hydraulic motor, a power driven pump, a reversible control pump and a fluid reservoir, said valve for controlling the flow of fluid between said pumps and said motor being of the open center spool type to permit a flow of fluid directed to said valve from said engine driven pump to pass directly through said valve to said reservoir when said spool is in a predetermined neutral position, said valve having a movable spool member movable from a neutral position to control the interconnection of said control pump with said engine driven pump, said valve spool when in a displaced position defining first and second valve chambers and providing a first flow of fluid from said engine driven pump to said control pump, a second flow of fluid at a relatively higher pressure than said engine driven pump fluid from said control pump through said first valve chamber to said hydraulic motor, and a third flow of low pressure fluid displaced from said hydraulic motor and directed through said second valve chamber to said reservoir, the improvement comprising means providing a third valve chamber between said first and second valve chambers; and means providing an auxiliary circuit within said valve wherein fluid from said engine driven pump is moved into said third valve chamber to limit leakage of fluid from said control pump into said second valve chamber of low pressure fluid.

4. In a control valve for a hydraulic servo system having a reversible hydraulic motor, a power driven pump and a reversible control pump, said control valve controlling the flow of fluid between said pumps and said motor, said valve having a pair of motor ports connected to the motor, a pair of control ports connected to said control pump; a pressure port receiving fluid discharged from said power driven pump, and return port means for return of fluid to a reservoir, said valve also having a valve spool member movable from a neutral position to control the interconnection of said ports, said spool member when in said neutral position interconnecting said control ports with said motor ports and blocking communication of those ports with said pressure port and said return port means whereby a flow of fluid under pressure from said power driven pump is directed through said valve back to said reservoir, said valve spool member when moved from said neutral position to a displaced position interconnecting said ports to provide first and second valve passageways, said first valve passageway connecting said pressure port and one of said control ports whereby fluid from said power driven pump passes through said control pump before being directed to said motor, said second valve passageway connecting said other control port and said hydraulic motor, the improvement comprising valve means to restrict valve leakage of control pump fluid in said second valve passageway, said valve means providing a third valve passageway directing high pressure fluid from said power pump between said first and second valve passageways.

5. In a hydrostatic power steering system for a vehicle having ground engaging elements to be steered, said system including a reservoir, a power pump, an open center spool valve, a manually actuated control pump, and a reversible steering cylinder connected to said elements to be steered, said spool valve having a movable spool member disposed therein in a shiftable position from a predetermined neutral position, resilient centering means opposing displacement of said spool member from said neutral position, said valve member when in said neutral position permitting a flow fluid from said power pump through said valve to said reservoir, said valve member when in displaced position interconnecting said steering cylinder with said control pump and said power pump to permit a flow of fluid from said power pump to pass through said valve to said control pump prior to being directed by said valve to said steering cylinder, said valve with said spool member in displaced position having a first high pressure fluid chamber containing high pressure fluid from said control pump and having a second low pressure fluid chamber of relatively low pressure fluid displaced from said steering cylinder and returning to said reservoir, the improvement comprising means providing a third intermediate pressure chamber of fluid from said power pump, said third chamber being positioned in said valve between said first high pressure chamber and said second low pressure chamber to limit leakage of high pressure fluid from said control pump into said chamber of low pressure fluid returning to said reservoir.

6. In a hydrostatic power steering system including a reversible hydraulic steering cylinder connected to vehicle wheels to be steered, an engine driven power pump, a reversible manually actuated control pump connected to a steering wheel and operated thereby, and an open center spool valve for controlling a flow of fluid between said pumps and said hydraulic steering cylinder, said valve having a housing with a movable valve spool member therein, said housing being provided with first and second cylinder ports connected to opposite ends of said hydraulic steering cylinder, first and second control ports connected to opposite ends of said control pump, a power port receiving fluid discharge from said engine driven power pump, and a pair of return ports connected to a fluid reservoir, said valve spool member being movable in opposite directions from a neutral position to control the interconnection of said ports, said valve when said spool member is in neutral position serving to interconnect said first and second control ports respectively with said first and second cylinder ports and to block communication of the cylinder ports and said control ports with said pressure port and said return ports whereby to permit the control pump to operate the steering cylinder and to permit a flow of fluid from said pressure pump through said return port to reservoir; means responsive to a pressure differential resulting from operation of said control pump for urging said movable spool member from its neutral position; resilient centering means opposing displacement of said spool member from said neutral position, said centering means being adapted to maintain the valve spool member in a neutral position until said pressure differential exceeds a predetermined value; said spool member when in displaced position interconnecting said ports to provide a fluid circuit between said power port and said return ports permitting a flow of displaced fluid from said steering cylinder into said valve and thence to said manually operated pump when said engine driven pump is not operating, and permitting a flow of fluid from said power pump to said first control port and to said control pump when said engine driven pump is operating, the improvement comprising: means providing a pair of oppositely disposed intermediate ressure cavities defined between said valve housing and said spool member, said cavities being positioned respectively on opposite sides of said valve between said first cylinder port and one of said return ports and said second cylinder port and said other return port whereby when said spool is actuated to a displaced position on one side or the other of said valve with said engine driven pump operating to circulate fluid under high pressure to said control pump and thence to said hydraulic steering cylinder, fluid from said engine driven pump is directed into one of said intermediate cavities disposed between one of said return ports and one of said control ports carrying fluid from said control pump to said reversible steering cylinders, thus limiting leakage of high pressure fluid from said control pump into said return port.

7. In a hydraulic steering system including a fluid reservoir, a double acting steering cylinder, an engine driven pump, a reversible manually actuated control pump connected to a steering wheel to actuate said pump, and a valve for controlling the flow of fluid between said pumps and said motor, said valve being of the open center spool type and having a pair of oppositely disposed cylinder ports connected to said steering cylinder, a pair of oppositely disposed control ports connected to said control pump, a pressure port receiving fluid discharged from said engine driven pump, and a pair of oppositely disposed reservoir return ports for the return of fluid displaced from said steering cylinder to said reservoir, said valve having a shiftable spool member being shiftable within said valve in opposite directions from a neutral position to control the interconnection of said ports, said spool member when in said neutral position interconnecting said control ports with said cylinder ports and blocking communication of those ports with said pressure port and said return port whereby to permit a flow of fluid from said engine driven pump through said valve to said return port and thence to said reservoir, means in said valve spool member responsive to the pressure differential resulting from operation of said control pump for urging said valve spool member to a certain displaced position, said valve spool member when in displaced position interconnecting said ports to provide between said pressure port and said return port a fluid circuit including the manually actuated control pump and the cylinder whereby fluid displaced in operation of the cylinder when said engine driven pump is not operating will pass through the control pump rather than returning to reservoir, the improvement in such a system when said engine driven pump is operating comprising: means providing a pair of oppositely disposed fluid chambers in said valve and valve passageways in communication with said chambers, said chambers being disposed one on either end of said valve between one of said cylinder ports and one of said reservoir return ports, said fluid chambers being in communicaation with said pressure port whereby when said valve spool member is in a displaced position a fluid circuit is provided through said valve filling one of said fluid chambers with high pressure fluid from said power pump, said fluid chamber being disposed adjacent said cylinder port carrying fluid under high pressure from said control pump to said cylinder, whereby leakage of high pressure fluid from said manually operated pump contributing to slip of said steering wheel is effectively prevented.

References Cited by the Examiner
UNITED STATES PATENTS

| | | | |
|---|---|---|---|
| 2,974,491 | 3/1961 | Cassaday et al. | 60—52 |
| 2,995,012 | 8/1961 | Cassaday et al. | 60—52 |

EDGAR W. GEOGHEGAN, *Primary Examiner.*